(No Model.)
J. H. McGREW.
STEREOSCOPIC ALBUM.
No. 472,196. Patented Apr. 5, 1892.
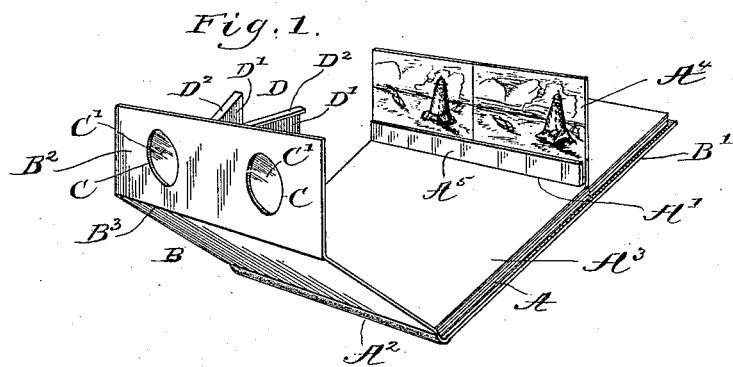
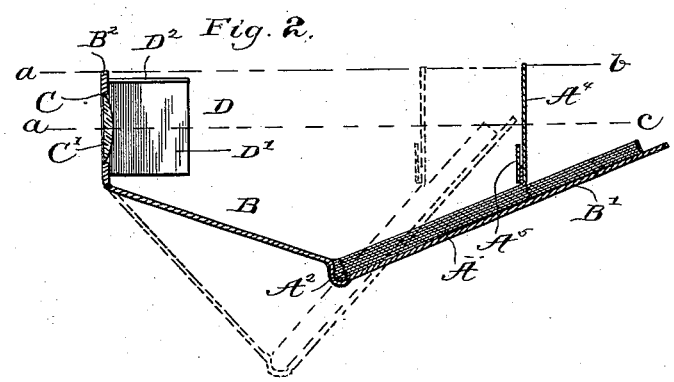
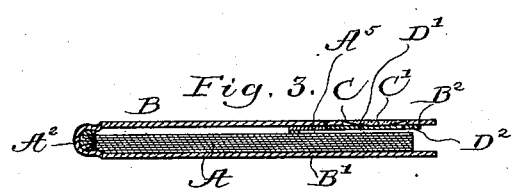
Witnesses: Inventor:
Ambrose Risdon Jasper H. McGrew
Frank L. Stevens By Cyrus Kehr
Atty.

UNITED STATES PATENT OFFICE.

JASPER H. McGREW, OF CHICAGO, ILLINOIS.

STEREOSCOPIC ALBUM.

SPECIFICATION forming part of Letters Patent No. 472,196, dated April 5, 1892.

Application filed October 23, 1891. Serial No. 409,593. (No model.)

*To all whom it may concern:*

Be it known that I, JASPER H. McGREW, a citizen of the United States, residing at Chicago, in the county of Cook and State of Illinois, have invented certain new and useful Improvements in Stereoscopic Albums; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to combine a stereoscope with an album in such manner as to allow focusing of the lens or lenses with reference to the view or views in the album, and also to leave suitable spaces adjacent to the views for descriptive or other printed or written matter which does not require enlarging.

In the accompanying drawings, Figure 1 is a perspective view of the album when open. Fig. 2 is a view of the album looking at the same edgewise when open. Fig. 3 is a similar view of the album closed. Fig. 4 is a view looking edgewise at one end of the cover containing the lenses.

The album is in book form, and the leaves A are arranged to fold on a line $A'$, parallel to the back $A^2$ of the cover, and located sufficiently far from such back to divide the leaf into two sections $A^3$ and $A^4$ of desired relative sizes. Upon the sections $A^4$ are placed the photographs or stereoscopic views which are to be enlarged by the lens or lenses, the tops of said views being placed farthest from the back $A^2$ of the cover.

B is the cover toward which the views on the sections $A^4$ face, and $B'$ is the cover on the side of the leaves A opposite the cover B. The cover B is arranged to fold on the line $B^3$, which is also parallel to the back $A^2$ and approximately as far from said back as are the lines $A'$, so that a folding section $B^2$ of said cover B is formed approximately equal to the sections $A^4$ of the leaves A. Said section $B^2$ has one or more apertures C containing the lens $C'$. When the album is closed and not in use, the leaves A and covers B and $B'$ are straight and parallel and in contact with each other, as in an ordinary book, the section $B^2$ of the cover B lying over a portion of the leaves A and actually constituting a part of the book. When the pictures upon the sections $A^4$ are to be viewed, the cover B is to be turned away from the leaves A and the section $B^2$ of the cover B turned toward the leaves A, and the section $A^4$ of the first leaf A turned toward the cover B until the section $A^4$ and the section $B^2$ are opposite and parallel, as shown in Figs. 1 and 2. Then the person viewing the pictures will look through the lens or lenses $C'$ and ascertain whether said lens or lenses are properly focused with reference to the picture or pictures on the section $A^4$. If they are not properly focused with reference to the picture or pictures on the section $A^4$, the section $A^4$ is moved backward or forward in a line perpendicular to the section $B^2$ and at the same time kept parallel to said section, the back of the book being made to rise and fall, as may be required, so that the upper edge of the section $B^2$ and the upper edge of the section $A^4$ remain in line and at the same elevation, as indicated by the dotted line $a\ b$ in Fig. 2, and the middle of the section $A^4$ will remain substantially opposite the center of the lenses, as indicated by the dotted line $a\ c$. Thus it will be seen the lenses will remain stationary, as in the ordinary stereoscope, while the view is moved back and forth toward and from said lenses opposite and parallel to the latter exactly as the view is moved back and forth on the slide in the ordinary stereoscope. As already stated, the lenses are supported in the section B, which is actually a part of the cover of the album, and not an appendage to the cover which serves only to hold the lenses and adds bulk and expense to the album. It will be seen that if the leaves are not made to fold on the line $A'$ and the cover B on the line $B^3$ the picture and the lenses cannot be brought into parallel and adjusted as to distance, as above described. If it is desired to view the picture on the second leaf A, the section $A^4$ of the first leaf A is folded toward the back $A^2$ until it lies upon the section $A^3$ of the first leaf A. Thus room is made for raising the section $A^4$ of the second leaf A. Subsequently the folded first leaf may be turned upon the back $A^2$ toward the cover B until it lies against the portion of said cover between the section $B^2$ and the back $A^2$. Then the section $A^4$ of the second leaf A may be turned upon its hinge toward the back $A^2$ until it is in contact with the section $A^3$ of said second leaf A. Subsequently the pictures upon the other leaves may be in a similar manner brought within the range of the lenses C. The cover B and the leaves A may be merely creased along the lines $B^3$ and $A'$, respectively, or they may each have a suitable hinge along the folded line. The surface of the section $A^3$ of the leaves A is designed to receive printed or written descriptive, narrative, or advertising matter in characters of normal size. The printed or written matter upon each section $A^3$ may relate to the picture upon the section $A^4$ of the same leaf. Thus if the picture upon one of the sections $A^4$ represents a light-house the printed matter upon the section $A^3$ of the same leaf may be descriptive or narrative matter relating to said light-house; or if the picture upon one of the sections $A^4$ is attractive and interesting the printed matter upon the section $A^3$ of the leaf of which said section $A^4$ is a part may be advertising-matter which it is sought to bring to the notice of the person viewing the picture. The section $A^4$ nearest the cover B may have along its base at the side toward said cover a strip $A^5$, applied by its lower edge to said section $A^4$ so that space is left between the upper edge of said strip and said section $A^4$ to receive the base of a sheet or card bearing a picture not a part of the album. Thus my stereoscopic album may be used as a stereoscope for such other views aside from those in the album as the person using the album may have at hand.

In order that the eye may not see the two pictures on a stereoscopic card through the same lens, I provide a folding partition D on the inner face of the section $B^3$ between the lenses C. Said partition may consist of only one section; but a convenient form consists of two sections $D'$ $D'$, as shown by the drawings. Each such section may consist of a rectangular piece of pasteboard hinged by one edge in a vertical line to the inner face of said section $B^3$ a little away from the middle of said section and in such manner as to fold toward the nearest edge of said section flatwise against said section, so that when it is desired to fold the album said section $D'$ is inclosed within the album and occupies a space equal only to the thickness. Different expedients might be adopted for holding said sections $D'$ in a definite position and turned out away from the section $B^2$ for use. The drawings show a flap $D^2$, hinged along the upper edge of each section $D'$ and adapted to be turned into a horizontal position, as shown in Figs. 1 and 2, and bear by one corner against or into the inner face of the section $B^2$. Fig. 4 shows indentations $d^2$ in the section $B^2$ for receiving the inner free corners of the flaps $D^2$. Said flaps $D^2$, it will be seen, are adapted to be turned upward into the plane occupied by the section $D'$, supporting said flap, so that said flaps, as well as said sections $D'$, will lie closely against the inner face of the cover B.

I claim as my invention—

1. A stereoscopic album consisting of leaves A, composed of sections $A^3$ and $A^4$, and equal covers $B'$ and B, the latter being hinged transversely to form a folding section $B^2$, a lens or lenses located in said section $B^2$, and pictures located upon said section $A^4$ upon the sides of the latter toward the said cover B, substantially as shown and described.

2. A stereoscopic album consisting of leaves A, composed of sections $A^3$ and $A^4$, and covers $B'$ and B, the latter having a folding section $B^2$, a lens or lenses located in said section $B^2$, pictures located upon said section $A^4$ upon the sides of the latter toward the said cover B, and printed matter being placed upon the sides of the sections $A^3$ toward the cover B, substantially as shown and described.

3. A stereoscopic album consisting of leaves A, composed of sections $A^3$ and $A^4$, and covers $B'$ and B, the latter having a folding section $B^2$ away from the back $A^2$ a distance equal to the distance between the back $A^2$ and the section $A^4$, substantially as shown and described.

4. A stereoscopic album consisting of leaves A, composed of sections $A^3$ and $A^4$, and covers $B'$ and B, the latter having a folding section $B^2$ away from the back $A^2$ a distance equal to the distance between the back $A^2$ and the section $A^4$, and having one or more openings C, containing a lens $C'$, and a picture or pictures upon said sections $A^4$ on the side of the latter toward said section $B^2$, substantially as shown and described.

5. A stereoscopic album consisting of leaves A, composed of sections $A^3$ and $A^4$, and covers $B'$ and B, the latter having a folding section $B^2$ away from the back $A^2$ a distance equal to the distance between the back $A^2$ and the section $A^4$, and having one or more openings C, containing a lens $C'$, and a picture or pictures upon said sections $A^4$ on the side of the latter toward said section $B^2$, and printed matter upon the side of the sections $A^3$ toward the cover B, substantially as shown and described.

6. In a stereoscopic album having leaves A and suitably-supported lenses C, arranged to be directed toward said leaves, a picture-support applied to the face of one of said leaves toward said lenses and adapted to receive the lower edge of a sheet or card bearing a picture, substantially as shown and described.

7. In a stereoscopic album having leaves A and a cover B, bearing a folding section containing lenses adapted to be directed toward said leaves, a folding partition applied between said lenses to the face of said section $B^2$ which is directed toward said leaves, substantially as shown and described.

8. In a stereoscopic album having leaves A and a cover B, bearing a folding section containing lenses adapted to be directed toward said leaves, of two folding sections D', applied between said lenses to the face of said section $B^2$ which is directed toward said leaves, substantially as shown and described.

9. In a stereoscopic album having leaves A and a cover B, bearing a folding section containing lenses adapted to be directed toward said leaves, folding sections D' and flaps $D^2$, applied between said lenses to the face of said section $B^2$ which is directed toward said leaves, substantially as shown and described.

In testimony whereof I affix my signature, in presence of two witnesses, this 20th day of October, in the year 1891.

JASPER H. McGREW.

Witnesses:
 FRANK L. STEVENS,
 AMBROSE RISDON.